United States Patent [19]

Miyawaki

[11] Patent Number: 5,162,067
[45] Date of Patent: Nov. 10, 1992

[54] STEEL CORD OF SUBSTANTIALLY ELLIPTICAL CROSS-SECTION AND TIRE REINFORCED WITH SAME

[75] Inventor: Hisamune Miyawaki, Miki, Japan

[73] Assignee: Tokusen Kogyo Company Limited, Hyogo, Japan

[21] Appl. No.: 418,635

[22] Filed: Oct. 10, 1989

[30] Foreign Application Priority Data

Oct. 11, 1988 [JP] Japan ................ 63-256764

[51] Int. Cl.5 ............... B60C 9/00; B60C 9/20
[52] U.S. Cl. .................. 152/451; 57/200; 57/902; 152/527; 428/295
[58] Field of Search ........ 152/451, 527, 556; 57/902, 200; 428/295

[56] References Cited

U.S. PATENT DOCUMENTS

| 4,509,318 | 4/1985 | Yoneda ............ 57/212 |
| 4,850,412 | 7/1989 | Gupta ............ 152/556 |
| 4,938,015 | 7/1990 | Kinoshita ............ 57/200 |

FOREIGN PATENT DOCUMENTS

| 59-156805 | 9/1984 | Japan ............ 152/527 |
| 59-157391 | 9/1984 | Japan . |
| 60-21435 | 6/1985 | Japan . |
| 61-108397 | 7/1986 | Japan . |

OTHER PUBLICATIONS

*Mechanics of Pneumatic Tires*, ed. Samuel Clark: U.S. Dept. of Transportation, Aug. 1981, p. 81.

Primary Examiner—Michael W. Ball
Assistant Examiner—Adrienne Johnstone
Attorney, Agent, or Firm—Wenderoth, Lind & Ponack

[57] ABSTRACT

A steel cord is disclosed for use in reinforcing rubber products, especially automobile tires. In order to provide desirable rubber penetrability and break-resistance, three to six material wires are intertwisted into a steel cord having an elliptically shaped cross section having a ratio of its major diameter to its minor diameter of between 1.1 and 2.2. The cord is formed such that its material wires substantially contact each other near the ends of the major axis of the ellipse and are separated from each other near the end of the minor axis. The cord of the invention is normally formed such that a ratio the twist pitch to the material wire diameter is in the range of 30-80. However, if a high elongation of more than 5% is necessary, such can be imparted by intertwisting material wires such that the ratio of the twist pitch to the material wire diameter is in the range of 10-28.

12 Claims, 6 Drawing Sheets

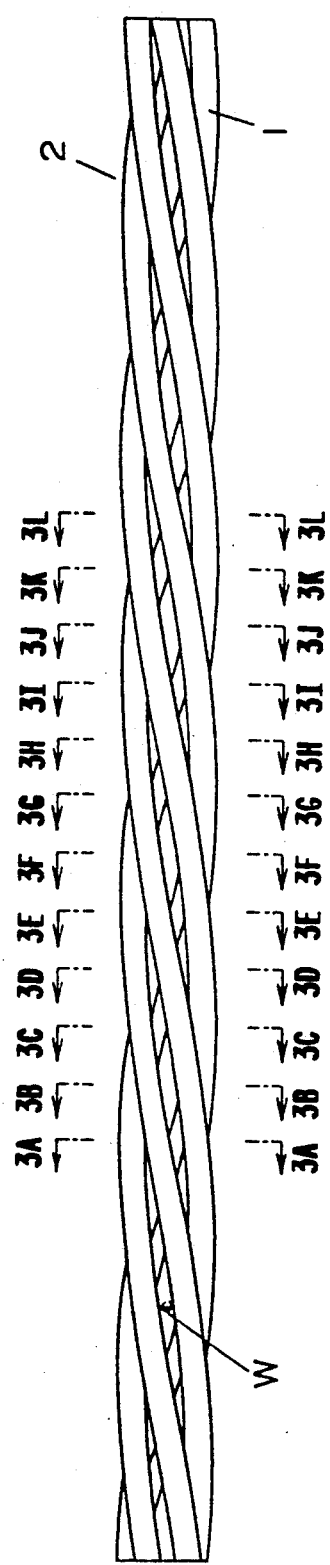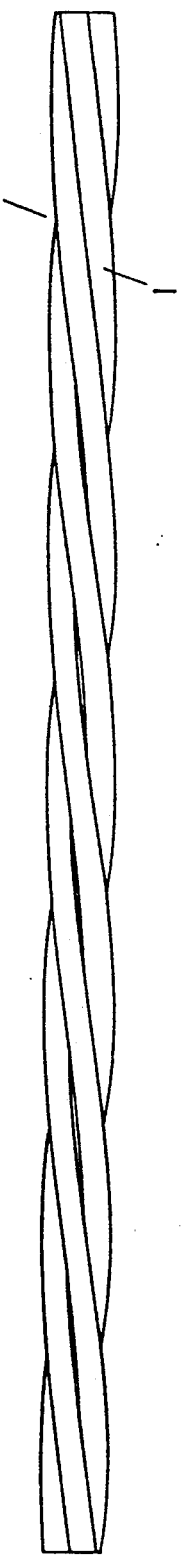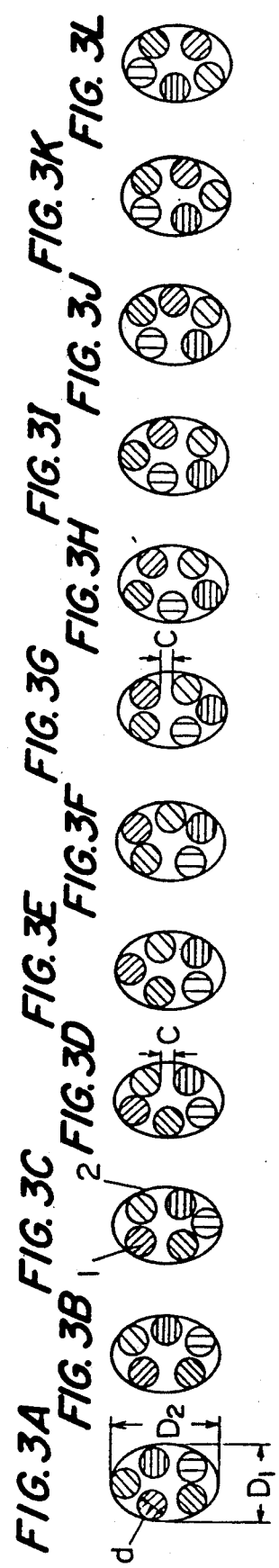

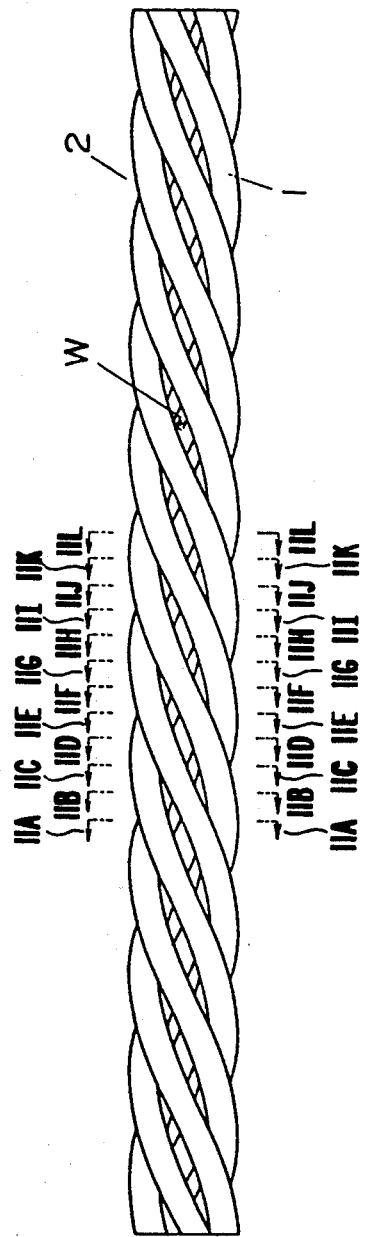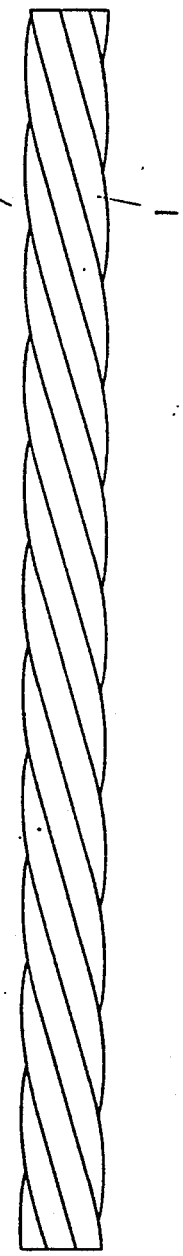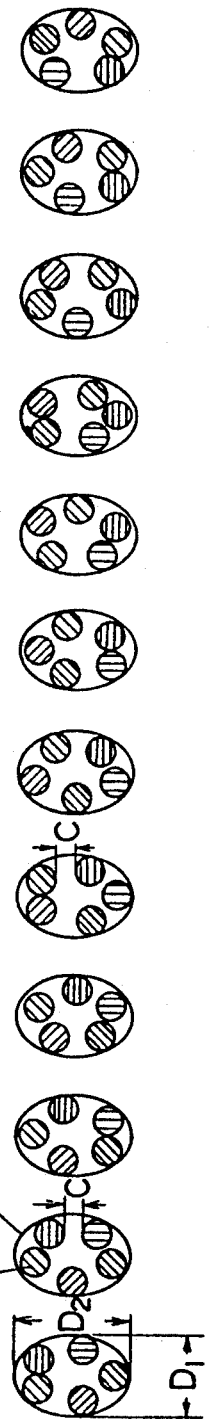

STEEL CORD OF SUBSTANTIALLY ELLIPTICAL CROSS-SECTION AND TIRE REINFORCED WITH SAME

BACKGROUND OF THE INVENTION

1. Field of the Invention

This invention relates to a steel cord of novel twist construction for use in reinforcing automobile tires, conveyor belts, etc., as well as a tire reinforced by such steel cords.

2. Description of the Prior Art

Conventionally, steel cords composed of four or five material wires intertwisted, namely, of the construction of 1×4 or 1×5, have been used for a reinforcing layer of a belt part of a steel radial tire. However, as shown in FIG. 18, since a steel cord (12) of 1×5 construction, for example, is composed of five material wires (11) twisted closely together, when a tire is formed rubber does not penetrate into a cavity (X) at the central part of a steel cord and thus the cavity (X) is left void along the lengthwise direction of the steel cord. Accordingly, in the case of tires using such steel cords, when the tire is damaged externally during the running of an automobile, water penetrates into the cavity (X) of the steel cord through cracks and further penetrates along the lengthwise direction of the steel cord, causing rusting of the steel cord and lowering of adhesiveness between the steel cord and rubber. Thus, the so-called "separation phenomenon" (in which the steel cord and rubber are separated from each other) occurs and the usable life of the tire is significantly shortened. In order to prolong the usable life of automobile tires and to make tires lighter in weight, it has been required recently to improve corrosion resistance and break-resistance of steel cords. Also, the so-called "open cord" with improved adhesiveness between steel cord and rubber by making rubber penetrate deeply into the steel cord has been developed.

The above-mentioned steel cord, as shown in FIG. 19, is substantially circular in cross section and is composed of five material wires (11) intertwisted in such a fashion that a clearance (Y) exists between material wires. However, since this steel cord is constructed with a substantially circular cross section and has a large amount of free space which allows movement of material wires, in forming tires such free space is reduced due to tension applied to the steel cord, with the result that rubber cannot penetrate fully into the steel cord and adhesiveness between material wires and rubber is lowered. Moreover, during of vulcanizing of the rubber, material wires of the above-mentioned steel cord are elongated and are turned due to tensile forces caused by flowing of the rubber as it is melted or softened by heating or due to a twisting force in the lengthwise direction of the steel cord, such that clearance between the material wires are reduced. Thus, rubber cannot penetrate fully into the steel cord, causing corrosion and "separation phenomenon" to occur in the steel cord such that the usable life of the tire is shortened.

When a tire runs on pebbles, carbstone or the like, steel cords are liable to break. In order to improve break-resistance of steel cords, it has been suggested to use a so-called "high elongation cord" (steel cord which allows a belt part of the tire to undergo significant elongation). At the present time, steel cords having plural twisted layers (twist construction of 3×7, 4×2, 4×4, etc.) and a relatively small twist pitch are used as high elongation cords for belt parts of tires for trucks and buses. Also, steel cords of a single twisted layer (1 ×4, 1×5, etc.) are used.

However, the above steel cords having multiple or plural twisted layers are faced with disadvantages such as low productivity and high manufacturing cost due to the small twist pitch and the plural twisting. In the case of steel cords having a single twisted layer, they have disadvantages such as low elongation before breakage (e.g. 2.5-3.8%) such that they cannot be used as high elongation cords.

SUMMARY OF THE INVENTION

An object of the present invention is to stabilize a twist construction of steel cord, to improve penetrability of rubber during covering of the steel cord with rubber and to improve corrosion resistance of steel cords. Where necessary, high elongation of more than 5% is given to steel cords so as to improve break-resistance of steel cords.

Another object of the present invention is to prolong the usable life of tires by improving the durability of rubber reinforcements and to reduce the weight of tires by reducing the thickness of belt parts of the tires.

In order to attain the above-objects, in the present invention a steel cord of a single twisted layer is formed by intertwisting three to six material wires has such construction that its cross sectional shape is substantially elliptical along its length, the ratio between the major diameter $D_2$ and the minor diameter $D_1$ of the ellipse is within the range of $$1.1 \leq \frac{D_2}{D_1} \leq 2.2,$$

and adjacent material wires Ii.e. wires which are mutually adjacent along a circumferential direction of the cross section) are close to or substantially in contact with each other near the ends of the major axes, but are separated from each other near the ends of the minor axes. The steel cord is to be formed such that a frequency N of the appearance of the above cross section (wherein adjacent material wires are close to or in substantial contact with each other) should be as shown below, in relation to one twist pitch.

Wherein n = the number of strands of metallic material wire;

in the case where n is an even number, $N = n$;
in the case where n is an odd number, $N = 2n$.

The above steel cord is formed such that adjacent material wires are close to or in contact with each other near the ends of the major axis of the elliptical cross section (such that they are separated by 10 percent of the material wire diameter), but are separated by a gap of 20-100 percent, preferably 35-50 percent, of the material wire diameter near the ends of the minor axis.

Also, the above steel cord is formed so that material wires adjacent one another along the direction of the major axis of the ellipse have a gap formed therebetween which is shaped like a long hysteresis loop, and so that such gaps exist at substantially regular intervals along the length of the cord. The cord is composed such that the largest width of the hysteresis loop shaped gap is within the range of 20-100 percent of the material wire diameter. The above steel cord is also composed such that after vulcanization of the rubber, it constitutes a structure with rubber wherein adjacent material wires are separated by gaps of at least four percent of the material wire diameter.

The above steel cord can be composed so as to have a ratio between the twist pitch and the material wire diameter in the range of 10-28 if high elongation is necessary. Otherwise, the ratio is preferably in the range of 30-80.

A plurality of steel cords composed as mentioned above are arranged in a row and covered with a rubber sheet to form a rubber structure. A tire can be formed by arranging a plurality of such rubber structures at a belt part of the tire.

The above steel cord according to the present invention has good stability in twist construction and shows only a slight narrowing of the gaps between material wires during covering of the cord with rubber. That is, the present invention provides for ample penetration of rubber into the central part of the cord. Good penetration of rubber between the material wires of a steel cord results in very good adhesiveness between the cord and the rubber and can prevent corrosion of the cords and "separation phenomenon" between the rubber and the cord. Also, a high elongation (more than 5% as in the case of plural twisted layers) can be obtained from a single twisted layer.

The above steel cord imparts good wear-resistance and break-resistance to tires and allows rubber to penetrate into the central part of the cord because the gaps formed between the material wires are unaffected by external forces, with the result that material wires are prevented from corroding and the usable life of the tires is significantly improved.

Since the above steel cord is of a single twist construction, it can be manufactured at less expense than the steel cords of a plural twisted layer construction.

In the case where the above steel cord is used for rubber structures of tires, durability is significantly improved. Accordingly, use of the above steel cord for tires improves the usable life of the tires, prevents the tires from bursting and improves safety during running of an automobile. Also, since the above steel cord has a cross section of elliptical shape for which the major and minor axes continue along a single plane, it is possible to reduce the thickness of the tire by arranging the minor diameter side of the elliptical cross section in the direction of thickness of rubber of the tire (i.e. in the radial direction of the tire). Thus, the tires can be reduced in weight.

BRIEF DESCRIPTION OF THE DRAWING

The nature and advantages of the present invention will be understood more clearly from the following detailed description of the invention made with reference to the accompanying drawings, in which:

FIG. 1 is a plan view of a steel cord according to embodiment 1;

FIG. 2 is a front view of the steel cord shown in FIG. 1;

FIGS. 3A-3L are cross sections, taken along lines 3A—3A through 3L3L in FIG. 1, respectively;

FIG. 9 is a plan view of a steel cording according to embodiment 3;

FIG. 10 is a front view of the steel cord shown in FIG. 9;

FIGS. 11A through 11L are cross sections, taken along lines 11A—11A through 11L—11L in FIG. 10A, respectively;

DETAILED DESCRIPTION OF THE INVENTION

Embodiment 1

A cord of circular cross section and of single twisted layer open construction having a 1×5×0.25 twist was formed by intertwisting five material wires (1) (each having a diameter d of 25 mm$\phi$ and being plated with brass at its surface) in a twist direction and at a twist pitch P of 10 mm. Then the above cord was made into a steel cord (2) of substantially elliptical cross section by a processing means, such as a roller die, a die having elliptical holes, corrective roller, etc. As shown in FIGS. 1-3L, adjacent material wires (i.e. wires which are mutually adjacent along a circumferential direction of the cross section) (1) of the steel cord (2) are close to or in contact with each along the direction of the major axis (i.e. near the ends of the minor axis), but are separated from each other along the direction of the minor axis (i.e. near the ends of the major axis). the gaps between material wires (1) adjacent along the direction of the major axis having an average width within the range of 0.05-0.25 mm and preferably 0.11 mm. The ratio between a major diameter $D_2$ and a minor diameter $D_1$ of the ellipse is about 1.36.

The above steel cord (2) is so composed that the gaps between material wires which adjoin along the direction of the major axis of the ellipse are shaped like long hysteresis loops and are located at substantially regular intervals along the length of the cord (2) as shown in FIG. 1. The width of the hysteresis loop-shaped gap W is preferably about 57 percent as wide as the material wire diameter, at the widest point of the gap W.

Embodiment 2

Figure 4:
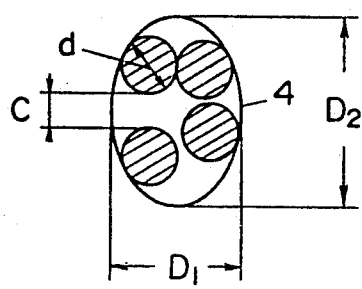
FIG. 4 is a cross section of a steel cording according to embodiment 2.

A cord of circular cross section and of a single twisted layer open construction having 1×4×0.25 twist was formed by intertwisting four material wires (3) (each having a diameter d of 0.25 mm$\phi$ and being plated with brass at its surface) in a twist direction and at a twist pitch P of 10 mm. By drawing the above cord through a die or by pressing it by rollers, the above cord was made into a steel cord (4) in which, as shown in FIG. 4, its circumcircle has a substantially elliptical cross sectional shape. Material wires (3) adjacent along the direction of the minor axis near the ends of the major axis are close to or in contact with each other, whereas the material wires adjacent along the direction of the major axis near the ends of the minor axis have a gap formed therebetween. The average gap (c) between material wires (3) adjacent along the direction of the major axis is within the range of 0.05-0.25 mm and preferable about 0.15 mm. The ratio between the major diameter $D_2$ and the minor diameter $D_1$ is about 1.4.

As the steel cords in the above embodiments 1 and 2 are formed substantially elliptical in cross sectional shape such that the direction of the major and minor axes remains constant along the entire length of the cord, even if external force, such as a pulling or drawing, is applied to the cord, it is possible to prevent rotation of the material wires. Moreover, as the material wires which adjoin along the direction of the minor axis near the ends of the major axis are close to or in contact with each other, and because the gap is formed between the material wires which adjoin along the direction of the major axis near the ends of the minor axis, free movement of the material wires due to external forces is prevented. Thus, the flowing of rubber during vulcanization thereof does not cause narrowing of the gaps between material wires. Furthermore, penetration of rubber into the cord is significantly improved, thereby resulting in an improvement in corrosion resistance.

In the above embodiments, the gap C between material wires is preferably greater than 20 percent of the material wire diameter. If it is less than 20 percent, the rubber does not penetrate fully into the cord during vulcanization of the rubber.

The positional relation between adjacent material wires should preferably be such that the more they approach the ends of the major axis, the closer they are to each other, and the more they approach the ends of the minor axis, the farther apart they are from each other.

A preferable ratio between the twist pitch, P and the material wire diameter d is within the range of $$30 \leq \frac{P}{d} \leq 80.$$

If the ratio is less than 30, the twist pitch becomes too short and the manufacturing cost increases. On the other hand, if the ratio exceeds 80, the twist pitch becomes too long and the effect of twist is lost, with the result that fatigue of the steel cord is accelerated.

$$\frac{P}{d}$$

is most preferably in the range of 35-50. However, if elongation of greater than 5 percent is necessary, the ratio of the pitch twist to the material wire diameter can be in the range of 10-28.

A preferable ratio between the major diameter $D_2$ and the minor diameter $D_1$ is within the range of $$1.1 \leq \frac{D_2}{D_1} \leq 2.2.$$

If the ratio is less than 1.1, the cross section of the cord resembles a circle and the problems which occur in conventional open cords is raised. On the other hand, if the ratio exceeds 2.2, the diameter of the cord becomes too large and when the cords are arranged in a row in rubber, the cords are too close or are in contact with each other. If a gap between the cords is increased, the number of cords used is reduced, with the result that the durability of the tire is reduced and the thickness of rubber reinforcing material utilized becomes larger.

$$\frac{D_2}{D_1}$$

is most preferably within the range 1.3-1.6.

Figure 6:
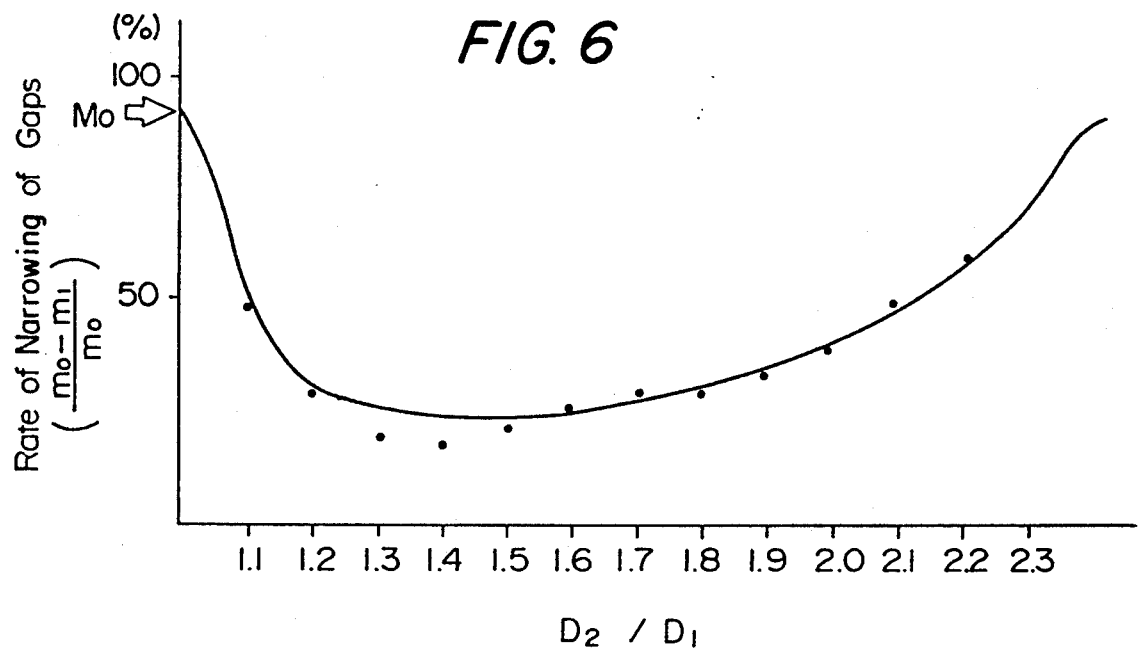
FIG. 6 is a curve, showing the rates of decrease of gaps measured by the method explained by FIG. 5.

FIG. 6 shows the rates of narrowing of gaps measured when steel cords having different ratios of $$\frac{D_2}{D_1}$$

were drawn under under a load of 10 kg.

Figure 5:
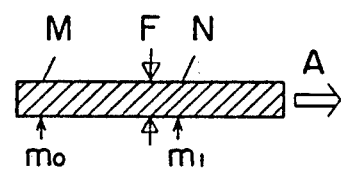
FIG. 5 is an explanatory drawing of a method of measuring the rate of decrease of gaps in a steel cord.

FIG. 5 shows the experimental method used to obtain the results in FIG. 6. In this method, the steel cord according to the present invention was pulled in the direction of arrow A, with a load of 10 kg. drawing force being applied at the point F. Then, the average gap $m_o$ of the cord at the point M (where no drawing force was applied) and the average gap $m_I$ of the cord at the point N (where drawing force was applied) were measured. The ratio between $m_I$ and $m_o$ or the rate of narrowing of gaps was obtained and shown in FIG. 6.

As is obvious from FIG. 6, the ratio between the major diameter $D_2$ and the minor diameter, $D_1$ of the cord should preferably be within the range of $$1.1 \leq \frac{D_2}{D_1} \leq 2.2,$$

with 1.3-1.6 being the most preferable range. In FIG. 6, $M_o$ represents the level of the rate of narrowing of gaps for conventional open cords.

Next, a comparative test was carried out to determine the penatrability of rubber for the steel cord of the present invention and for the conventional open cord.

First, the preparation of the test specimens will be described.

Steel cords A, B (see FIG. 8) according to the present invention (each formed by intertwisting five material wires having the diameter of 0.25 mm$\phi$ and plated with brass) having a twist construction of 1×5 and a ratio between the major diameter and the minor diameter of $$\frac{D_2}{D_1} = 1.85 \text{ and } \frac{D_2}{D_1} = 1.2,$$

respectively, and a conventional open cord C were prepared.

Figure 7:
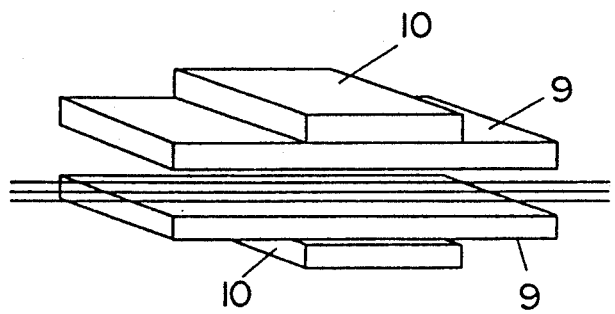
FIG. 7 is an explanatory drawing of a method of measuring the rate of rubber penetration into a steel cord.

As shown in FIG. 7, each of these cords was arranged between unvulcanized rubber (9), which are preferably 500 mm wide and 70 mm long, and each of two kinds of unvulcanized rubber (10), which are preferably 200 mm wide, with different thicknesses was placed at the uppermost surface and at the lowermost surface of the unvulcanized rubber (9) so as to vary the flow of rubber during vulcanization. In this state, the materials were vulcanized for 25 minutes at 150° C., while a pressure of 30 Kg/cm² was being applied from above and from below. Thus, specimens of two different kinds of rubber flow condition, as shown in the following table, were obtained.

TABLE

| Rubber | Flow condition | |
|---|---|---|
| | I | II |
| Thickness of unvulcanized rubber (9) (mm) | 1.2 | 1.2 |
| Thickness of unvulcanized rubber (10) (mm) | 0.6 | 1.2 |

During the above vulcanizing process, rubber at the central part began to flow toward an end portion of the steel cord, and a drawing force and a pulling force were impressed upon the steel cord at its end portion.

Figure 8:
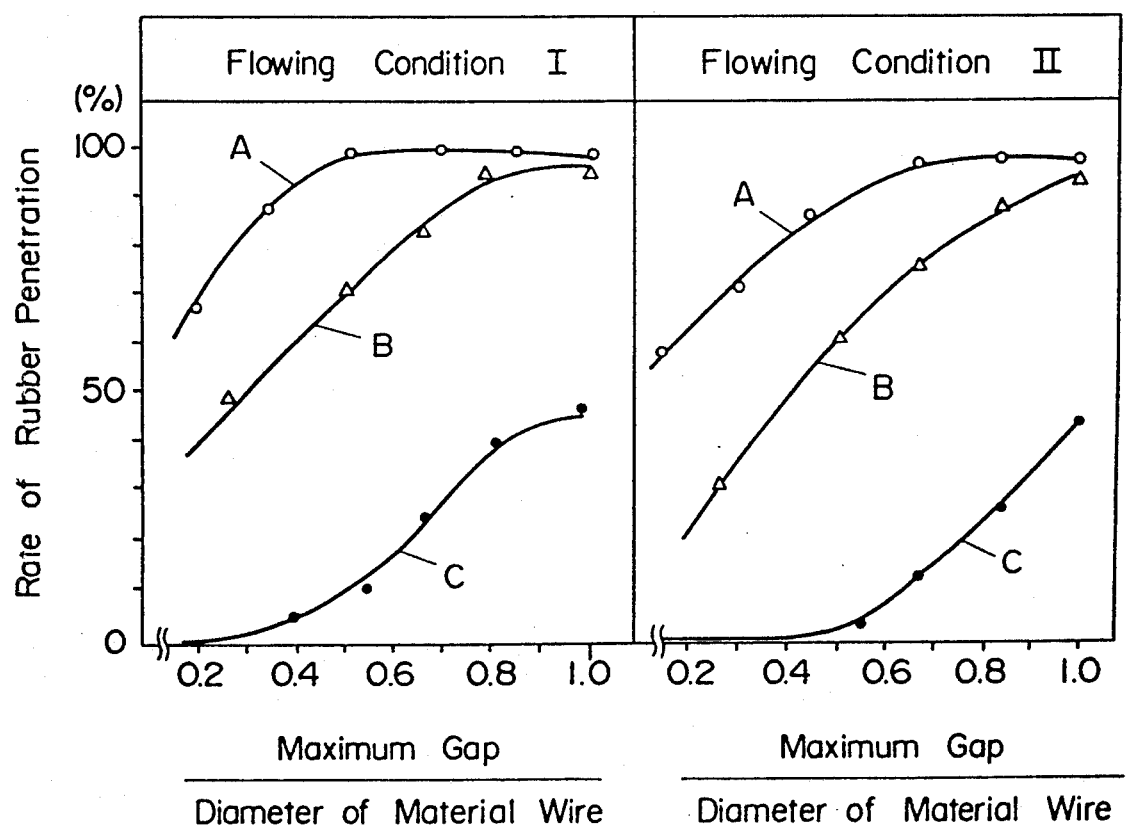
FIG. 8 is a curve, showing the rates of rubber penetration measured by the method explained by FIG. 7.

After vulcanization, materials in which the steel cord and rubber were united were taken out and the condition of the rubber which penetrated into gaps of the steel cord was examined, with the results as shown in FIG. 8.

As FIG. 8 indicates, as compared with the conventional open cord C, steel cords A and B according to the present invention had excellent penetrability characteristics.

Embodiment 3

Material wires (1) of 0.38 mm$\phi$ diameter were made by repeatedly subjecting a piano wire rod of 5.5 mm$\phi$ diameter to heat treatment and drawing, with brass plating applied during the process.

A cord of circular cross section and of single twisted layer open construction, having 1×5 twist and a ratio between twist pitch P and diameter of material wire d 17.1 (i.e. P/d=17.1) was made by intertwisting five strands of the above material wire (1) in the same direction and at a twist itch of 6.5.

Then, the above open cord was made into a substantially elliptical shape as shown in FIGS. 9-11L by rollers. A steel cord (2) was thus formed having a ratio between a major diameter $D_2$ and a minor diameter $D_2$ of its circumcircle in the range of 1.1-1.3 (i.e. $D_2/D_1 = 1.1-1.3$).

Embodiment 4

In a manner similar to Embodiment 3, material wires (3) of 0.30 mm$\phi$ diameter were made, and a cord of circular cross section and of single twisted layer open construction, having 1×4 twist and a ratio between twist pitch P and a diameter of material wire d of 20 (i.e. P/d=20) was made by intertwisting four strands of the above material wire (3) in the same direction and at a twist pitch of 6.0.

Figure 12:
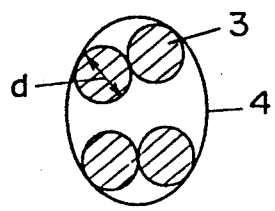
FIG. 12 and FIG. 13 are cross sections of a steel cord according to embodiment 4 at different positions along the length of the steel cord.
Figure 13:
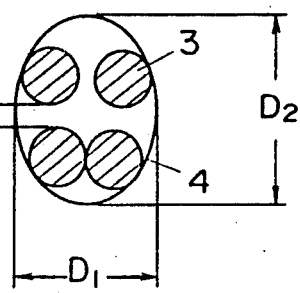

Then, the above open cord was made into a substantially elliptical shape as shown in FIGS. 12 and 13 by rollers. Thus, a steel cord (4) was formed having a ratio between the major diameter $D_2$ and the minor diameter $D_1$ of its circumcircle in the range of 1.2-1.4 (i.e. $D_2/D_1 = 1.2-1.4$).

In the above Embodiment 3 and 4, the most effective formation of the cord has been found to be when at least one gap C in the cross section of the cord is greater than 0.02 mm.

Moreover, in the above Embodiments 3 and 4, the perpendicular cross section of the cord was made substantially elliptical, but it si acceptable to have a true circular cross section shape along a portion of the length of the cord. In the embodiments, it is shown that at least one gap exists between material wires, but adjacent material wires may contact with each other along portions of the length of the cord.

Figure 14:
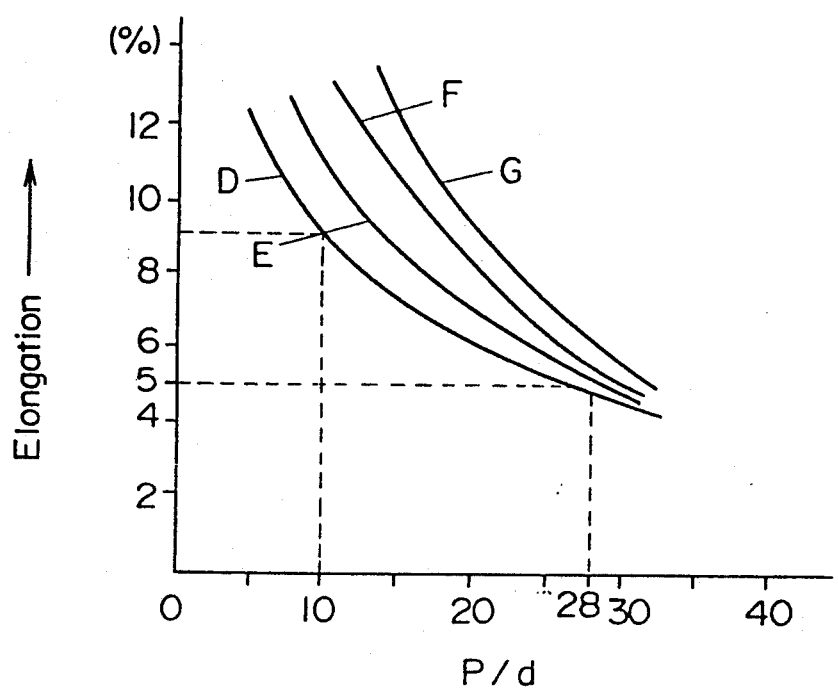
FIG. 14 is a curve, showing the relation between the twist pitch and the material wire diameter.

FIG. 14 shows the relation between the ratio of the twist pitch P to the diameter of material wire d and elongation for cords having single twisted layers of 1×3 (D), 1×4 (E), 1×5 (F) and 1×6 (G).

As is obvious from FIG. 14, in order to obtain a 5% elongation rate, P/d can be no greater than 28, and if it is reduced to less than 10, the cord strength decreases significantly and the manufacturing cost increases.

Figure 15:
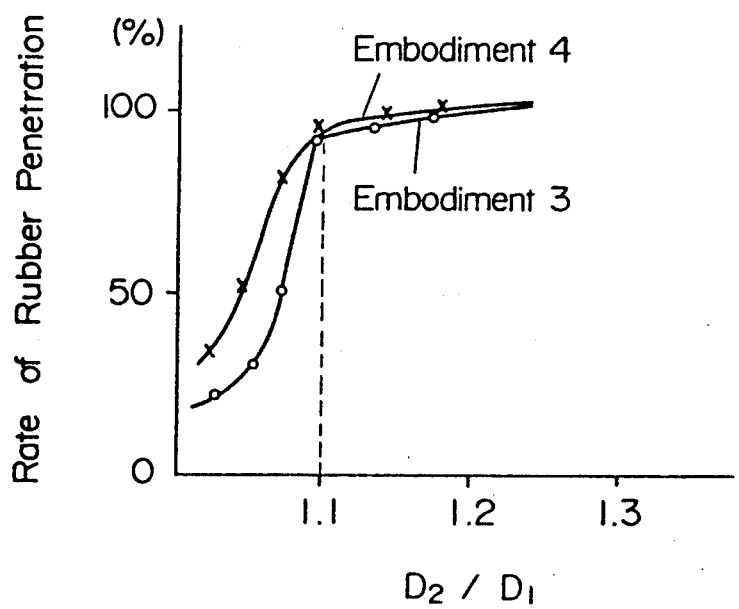
FIG. 15 is a curve, showing the relation between the ratio of a longer diameter to a shorter diameter versus a rate of rubber penetration.

FIG. 15 shows the rates of rubber penetration during rubber covering under the following vulcanizing conditions.

| | Embodiment 3 | Embodiment 4 |
|---|---|---|
| External force (Kg) (Tension) | 8 | 6 |
| Temperature (°C.) | 150 | 150 |
| Time (minutes) | 20 | 20 |
| Pressure (Kg/cm²) | 25 | 25 |

As is obvious from FIG. 15, if the cross sectional shape of a steel cord as represented by the ratio between the major diameter $D_2$ and the minor diameter $D_1$ is such that $D_2/D_1 > 1.1$, construction of the steel cord is stabilized and even if an external force is loaded in the lengthwise direction of the cord in the form of drawing, the cord will not turn and the gaps between the material wires will not be narrowed. Thus, rubber penetration can be effected smoothly.

Figure 16:
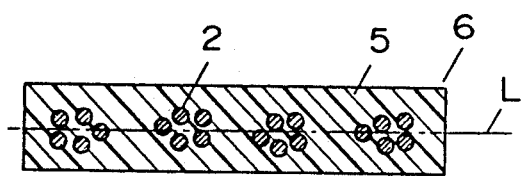
FIG. 16 is a cross section of a rubber structure.

As shown in FIG. 16, a structure (6) formed of steel cords (2) and rubber (5) can be formed by arranging a plurality of steel cords (2) obtained, for example, in accordance with Embodiment 1 in a row in such a fashion that the major axis L of each cord (2) is positioned substantially along the same axial line horizontally, and then covering the cords (2) with rubber material (5).

In the above structure (6), adjacent material wires, which were very close to each other near the ends of the major axes before vulcanization of the rubber, became separated from each other with a gap of more than 0.015 mm therebetween after vulcanization due to flowing of rubber.

Figure 17:
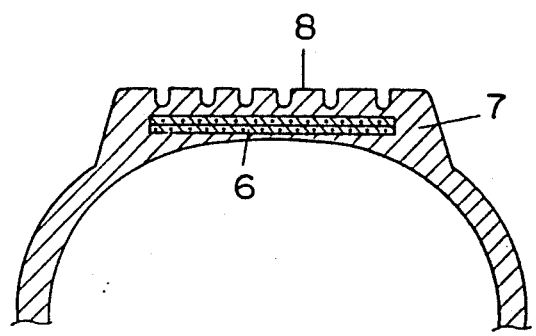
FIG. 17 is a cross section of a main part of a tire for which the rubber structure shown in FIG. 16 is used.
Figure 18:
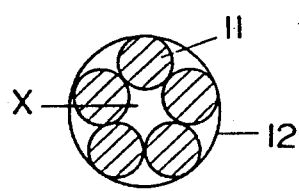
FIG. 18 and FIG. 19 are cross sections of conventional steel cords.
Figure 19:
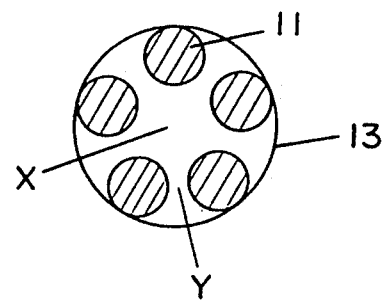

As shown in FIG. 17, a tire (8) can be constructed by arranging a plurality of the above structures (6) at the belt part (7) of a tire.

The steel cord structure 6 can be arranged at the belt part (7) as stated above, or it can be arranged at least at a part of the of the carcass or the chafer part of a tire.

I claim:

1. A steel cord comprising:
    a single twisted layer of three to six intertwisted material wires of a predetermined diameter;
    wherein said single twisted layer has a substantially elliptical cross section in a direction orthogonal to the length of said cord, said elliptical cross section having a major axis with a major diameter and a minor axis with a minor diameter, said elliptical cross section having a constant shape along the length of said single twisted layer;
    wherein, in said cross section, the ones of said material wires near the ends of said minor axis which are mutually adjacent along a circumferential direction of said cross section are separated from one another by a gap; and wherein, in said cross section, the ones of said material wires near the ends of said major axis which are mutually adjacent along said circumferential direction of said cross section are in mutual contact or are closer to one another than are said mutually adjacent ones of said material wires near the ends of said minor axis.

2. A steel cord as recited in claim 1, wherein
a ratio of said major diameter to said minor diameter is within a range of 1.1 to 2.2, inclusive.

3. A steel cord as recited in claim 1, wherein
said gap between said mutually adjacent ones of said material wires near the ends of said minor axis is within a range of 20 to 100 percent, inclusive, of the diameter of said material wires.

4. A steel cord as recited in claim 3, wherein
said mutually adjacent ones of said material wires near the ends of said major axis are separated by a distance which is less than 10 percent of the diameter of said material wires.

5. A steel cord as recited in claim 1, wherein
when viewed in a direction along said minor axis, said single twisted layer has a plurality of spaces formed between said material wires at substantially regular intervals along the length of said cord, said spaces being shaped like hysteresis loops.

6. A steel cord as recited in claim 1, wherein
said single twisted layer has a predetermined twist pitch; and
a ratio of said twist pitch to said predetermined diameter of said material wire is within a range of 30 to 80, inclusive.

7. A steel cord as recited in claim 6, wherein
said ratio of said twist pitch to said predetermined diameter is within a range of 35 to 50, inclusive.

8. A structure comprising:
a plurality of steel cords, each of said steel cords including
a single twisted layer of three to six intertwisted material wires of a predetermined diameter,
wherein said single twisted layer has a substantially elliptical cross section in a direction orthogonal to the length of said cord, said elliptical cross section having a major axis with a major diameter and a minor axis with a minor diameter, said elliptical cross section having a constant shape along the length of said single twisted layer,
wherein, in said cross section, the ones of said material wires near the ends of said minor axis which are mutually adjacent along a circumferential direction of said cross section are separated from one another by a gap, and
wherein, in said cross section, the ones of said material wires near the ends of said major axis which are mutually adjacent along said circumferential direction of said cross section are in mutual contact or are closer to one another than are said mutually adjacent ones of said material wires near the ends of said minor axis;
rubber covering said plurality of steel cords; and
wherein adjacent ones of said material wires of each of said steel cords are separated by a distance which is at least four percent of the diameter of said material wires.

9. A steel cord as recited in claim 8, wherein
when viewed in a direction along said minor axis, said single twisted layer has a plurality of spaces formed between said material wires at substantially regular intervals along the length of said cord, said spaces being shaped like hysteresis loops.

10. A tire comprising:
a structure having a plurality of steel cords and rubber covering said plurality of steel cords, each of said plurality of steel cords including
a single twisted layer of three to six intertwisted material wires of a predetermined diameter,
wherein said single twisted layer has a substantially elliptical cross section in a direction orthogonal to the length of said cord, said elliptical cross section having a major axis with a major diameter and a minor axis with a minor diameter, said elliptical cross section having constant shape along the length of said single twisted layer,
wherein, in said cross section, the ones of said material wires near the ends of said minor axis which are mutually adjacent along a circumferential direction of said cross section are separated from one another by a gap, and
wherein, in said cross section, the ones of said material wires near the ends of said major axis which are mutually adjacent along said circumferential direction of said cross section are in mutual contact or are closer to one another than are the ones of said material wires near the ends of said minor axis; and
wherein said major axis of said cross section is substantially aligned in a single plane along the entire length of each of said steel cords.

11. A tire as recited in claim 10, further comprising a belt part; and
wherein said structure is embedded at said belt part.

12. A tire as recited in claim 10, wherein
when viewed in a direction along said minor axis, said single twisted layer has a plurality of spaces formed between said material wires at substantially regular intervals along the length of said cord, said spaces being shaped like hysteresis loops.

* * * * *